United States Patent
Xu et al.

(10) Patent No.: US 9,483,321 B2
(45) Date of Patent: Nov. 1, 2016

(54) METHOD AND APPARATUS FOR DETERMINING TO-BE-MIGRATED TASK BASED ON CACHE AWARENESS

(71) Applicant: Huawei Technologies Co., Ltd., Shenzhen (CN)

(72) Inventors: Yuanchao Xu, Beijing (CN); Dongrui Fan, Beijing (CN); Hao Zhang, Beijing (CN); Xiaochun Ye, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/676,195

(22) Filed: Apr. 1, 2015

(65) Prior Publication Data

US 2015/0205642 A1  Jul. 23, 2015

Related U.S. Application Data

(63) Continuation of application No. PCT/CN2013/073174, filed on Mar. 26, 2013.

(30) Foreign Application Priority Data

Oct. 16, 2012 (CN) .......................... 2012 1 0392519

(51) Int. Cl.
*G06F 9/46* (2006.01)
*G06F 13/00* (2006.01)
(Continued)

(52) U.S. Cl.
CPC ........... *G06F 9/5088* (2013.01); *G06F 9/4881* (2013.01)

(58) Field of Classification Search
None
See application file for complete search history.

(56) References Cited

U.S. PATENT DOCUMENTS

2005/0071564 A1* 3/2005 Luick ................. G06F 12/0806
711/121

2008/0134184 A1 6/2008 Fedorova
(Continued)

FOREIGN PATENT DOCUMENTS

CN  101419561 A  4/2009
CN  101458634 A  6/2009
(Continued)

OTHER PUBLICATIONS

Fedorova, A., et al., "CASC: A Cache-Aware Scheduling Algorithm for Multithreaded Chip Multiprocessors," Retrieved from the Internet: URL:pdf.aminer.org/000/565/294/a_cache_aware_scheduling_alforithm_for_embedded_systems.pdf, (retrieved on May 27, 2013), 2005, 15 pages.

(Continued)

*Primary Examiner* — Bing Zhao
(74) *Attorney, Agent, or Firm* — Conley Rose, P.C.; Grant Rodolph; Nicholas K. Beaulieu

(57) ABSTRACT

A method and an apparatus for determining a to-be-migrated task based on cache awareness in a computing system having multiple processor cores is disclosed. In the method, the computing system determines a source processor core and a destination processor core according to a load of each processor core. Through respectively monitoring the number of cache misses of each task and the number of executed instructions of each task in the source processor core and the destination processor core, the computing system obtain an average cache miss per kilo instructions of the source processor core and an average cache miss per kilo instructions of the destination processor core. Then, the computing system determines, according to the obtained average cache miss per kilo instructions of the source processor core and the destination processor core, a task to be migrated from the source processor core to the destination processor core.

14 Claims, 7 Drawing Sheets

(51) Int. Cl.
  *G06F 9/50* (2006.01)
  *G06F 9/48* (2006.01)

(56) References Cited

U.S. PATENT DOCUMENTS

| | | |
|---|---|---|
| 2011/0066828 A1 | 3/2011 | Wolfe et al. |
| 2011/0246995 A1 | 10/2011 | Fedorova et al. |
| 2012/0180061 A1 | 7/2012 | Rao et al. |

FOREIGN PATENT DOCUMENTS

| | | |
|---|---|---|
| CN | 101706755 A | 5/2010 |
| CN | 102184125 A | 9/2011 |
| CN | 102483703 A | 5/2012 |

OTHER PUBLICATIONS

Foreign Communication From a Counterpart Application, PCT Application No. PCT/CN2013/073174, English Translation of International Search Report dated Jun. 13, 2013, 2 pages.

Foreign Communication From a Counterpart Application, PCT Application No. PCT/CN2013/073174, English Translation of Written Opinion dated Jun. 13, 2013, 7 pages.

Atta, I., et al., "Reducing OLTP Instruction Misses With Tread Migration," Proceedings of the Eighth International Workshop on Data Management on New Hardware, May 21, 2012, 8 pages.

Das, R., et al., "Application-to-Core Mapping Policies to Reduce Interference in On-Chip Networks," May 25, 2011, 24 pages.

Foreign Communication From a Counterpart Application, European Application No. 13847582.7, Extended European Search Report dated Jul. 9, 2015, 14 pages.

Foreign Communication From a Counterpart Application, Chinese Application No. 201210392519.X, Chinese Search Report dated Jun. 9, 2016, 2 pages.

Foreign Communication From a Counterpart Application, Chinese Application No. 201210392519.X, Chinese Office Action dated Jun. 29, 2016, 6 pages.

* cited by examiner

METHOD AND APPARATUS FOR DETERMINING TO-BE-MIGRATED TASK BASED ON CACHE AWARENESS

CROSS-REFERENCE TO RELATED APPLICATIONS

This application is a continuation of International Application No. PCT/CN2013/073174, filed on Mar. 26, 2013, which claims priority to Chinese Patent Application No. 201210392519.X, filed on Oct. 16, 2012, both of which are hereby incorporated by reference in their entireties.

TECHNICAL FIELD

The present invention relates to the field of computer science and technologies, and in particular, to a method and an apparatus for determining a to-be-migrated task based on cache awareness.

BACKGROUND

Task scheduling is one of the core functions of an operating system, and the quality of task scheduling directly affects performance, fairness, timeliness, and the like of program running. For an operating system with only a single processor core, task scheduling only needs to solve an issue of switching among different tasks. However, for an operating system with multiple processor cores, in addition to scheduling switching among different tasks, assignment of multiple tasks to the multiple processor cores and task migration processes among the multiple processor cores need to be processed, so as to ensure load balancing among the multiple processor cores.

In an operating system with multiple processor cores, multiple tasks need to contend for various shared resources, such as a shared cache, a memory controller, and a memory bus. Different tasks have different requirements for resources. If the foregoing resources are not considered during task scheduling performed by a processor, it results that resources of other processor cores are not fully used while a part of resources (such as a shared cache and a shared access memory) are contended for, so as to impose negative effects on performance of an entire system.

In processing of task scheduling in the prior art, during task migration, an operating system selects by default in descending order of priorities, from a tail of a highest priority linked list that includes tasks, tasks allowed to be migrated, but does not analyze a program of a task to be migrated or an effect of task migration on another task in a destination processor core to which the task is migrated. Therefore, performance and service quality of an entire system cannot be ensured. If the task to be migrated is not suitable to run in the destination processor core, the system performance may become extremely bad.

SUMMARY

To solve the foregoing problems, embodiments of the present invention provide a method and an apparatus for determining a to-be-migrated task based on cache awareness, which can enable an operating system to be aware of a program action, so as to select a more proper task during task migration, thereby relieving contention for processor resources and improving performance of the entire system.

According to a first aspect, an embodiment of the present invention discloses a method for determining a to-be-migrated task based on cache awareness in a computing system having multiple processor cores, where the method includes obtaining information about each processor core of multiple processor cores, where the information about each processor core includes load information of each processor core; determining a source processor core and a destination processor core according to the load information of each processor core; monitoring the number of cache misses of each task and the number of executed instructions of each task in the source processor core, obtaining a cache miss per kilo instructions (MPKI) of each task in the source processor core by calculation according to the number of cache misses of each task and the number of executed instructions of each task in the source processor core, and calculating an average MPKI of the source processor core according to the MPKI of each task in the source processor core; monitoring the number of cache misses of each task and the number of executed instructions of each task in the destination processor core, obtaining an MPKI of each task in the destination processor core according to the number of cache misses of each task and the number of executed instructions of each task in the destination processor core, and calculating an average MPKI of the destination processor core according to the MPKI of each task in the destination processor core; and determining, according to the average MPKI of the source processor core and the average MPKI of the destination processor core, a task to be migrated from the source processor core to the destination processor core.

According to the method for determining a to-be-migrated task based on cache awareness provided in the embodiment of the present invention, an operating system can be enabled to be aware of a program action, so as to select a more proper task during task migration, thereby reducing a probability of contention for processor resources and improving performance of an entire system; in addition, the operating system can be enabled to combine topology locations in which a source processor core and a destination processor core are located, so as to select a proper thread for migration. In addition, the embodiment of the present invention can not only be applied to a homogeneous multi-core environment, but also be applicable to a heterogeneous multi-core processor with asymmetric performance.

According to a second aspect, an embodiment of the present invention discloses an apparatus for determining a to-be-migrated task based on cache awareness in a computing system having multiple processor cores, where the apparatus a processor configured to obtain information about each processor core of the multiple processor cores is obtained, wherein the information about each processor core comprises load information of each processor core; and determine a source processor core and a destination processor core according to the load information of each processor core; monitor the number of cache misses of each task and the number of executed instructions of each task in the source processor core, obtain an MPKI of each task in the source processor core according to the number of cache misses of each task and the number of executed instructions of each task in the source processor core, and calculate an average MPKI of the source processor core according to the MPKI of each task in the source processor core; monitor the number of cache misses of each task and the number of executed instructions of each task in the destination processor core, obtain an MPKI of each task in the destination processor core according to the number of cache misses of each task and the number of executed instructions of each task in the destination processor core, and calculate an average MPKI of the destination processor core according to the MPKI of each task in the destination processor core; and determine, according to the average MPKI of the source processor core and the average MPKI of the destination processor core, a task to be migrated from the source processor core to the destination processor core.

According to the apparatus for determining a to-be-migrated task based on cache awareness provided in the embodiment of the present invention, an operating system can be enabled to be aware of a program action, so as to select a more proper task during task migration, thereby reducing a probability of contention for processor resources and improving performance of an entire system; in addition, the operating system can be enabled to combine topology locations in which a source processor core and a destination processor core are located, so as to select a proper thread for migration. In addition, the embodiment of the present invention can not only be applied to a homogeneous multi-core environment, but also be applicable to a heterogeneous multi-core processor with asymmetric performance.

An embodiment of the present invention further provides an apparatus for determining a to-be-migrated task based on cache awareness, where the apparatus includes a central processing unit (CPU) and a memory that stores executable program code, where the executable code may be used to obtain information about each processor core of at least two processor cores, where the information about each processor core includes load information of the processor core; determine a source processor core and a destination processor core according to the load information of each processor core; monitor the number of cache misses of each task and the number of executed instructions of each task in the source processor core, obtain an MPKI of each task in the source processor core by calculation according to the number of cache misses of each task and the number of executed instructions of each task in the source processor core, and calculate an average MPKI of the source processor core according to the MPKI of each task in the source processor core; monitor the number of cache misses of each task and the number of executed instructions of each task in the destination processor core, obtain an MPKI of each task in the destination processor core according to the number of cache misses of each task and the number of executed instructions of each task in the destination processor core, and calculate an average MPKI of the destination processor core according to the MPKI of each task in the destination processor core; and determine, according to the average MPKI of the source processor core and the average MPKI of the destination processor core, a task to be migrated from the source processor core to the destination processor core.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention.

Task migration means that, in a system with multiple processor cores, due to an imbalance among quantities of tasks in the processor cores, a part of tasks in a processor core with a relatively large number of tasks need to be migrated to a processor core with a relatively small number of tasks, in order to balance loads of different processor cores. Cache awareness means that, during task migration scheduling decision-making, an operating system uses a cache-related parameter related, for example, the number of cache misses of a task, as a decision-making basis. An MPKI of a task in a period of time is obtained by capturing the number of cache misses of the task in the period of time, dividing the number of cache misses by the number of executed instructions that are in the period of time to obtain a new number, and then magnifying the new number by 1000 times. In general, an absolute value of the number of cache misses is extremely small; therefore, the MPKI is adopted to more conveniently compare the numbers of cache misses of different processor cores.

Figure 1:
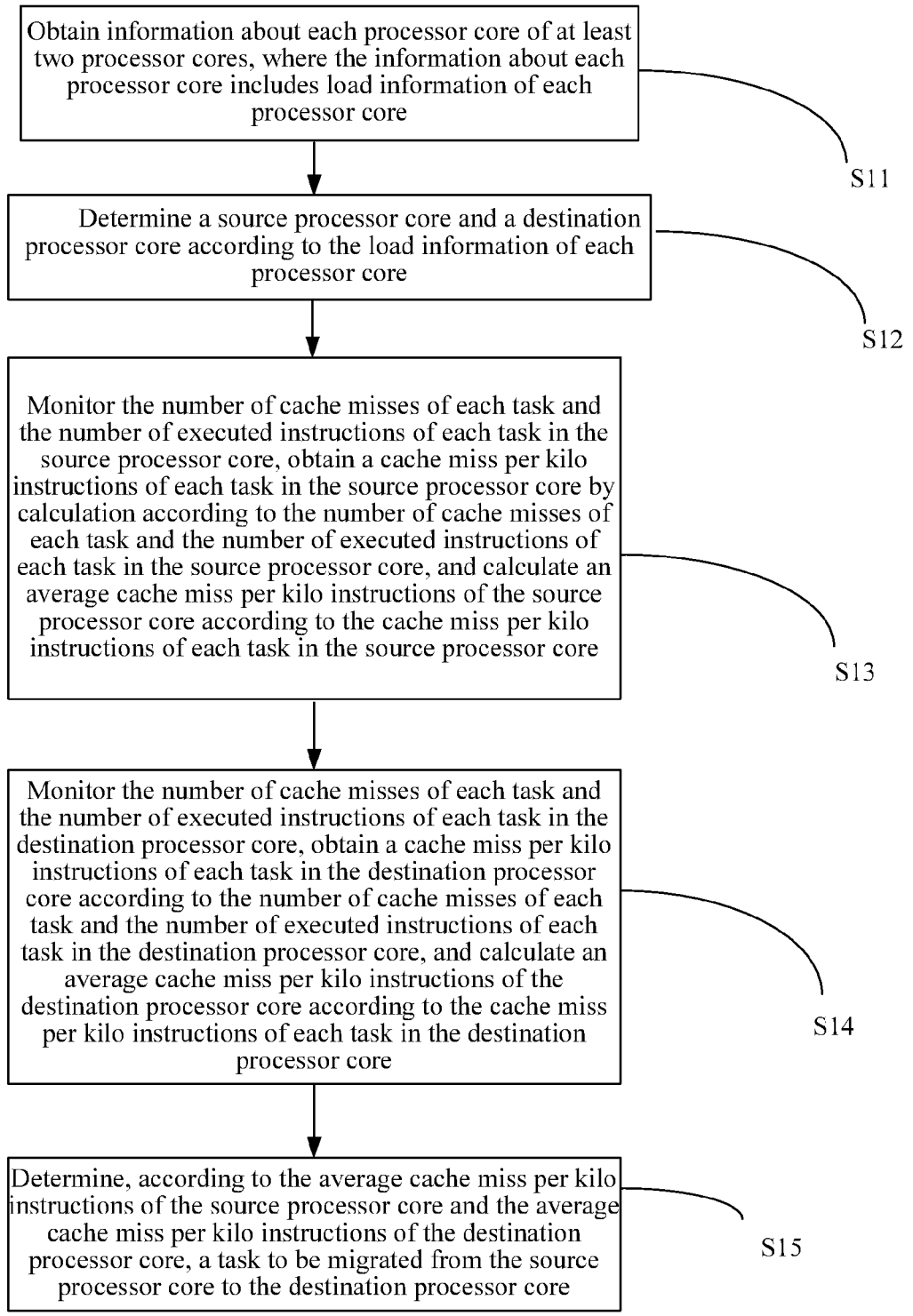
FIG. 1 is a flowchart of a method for determining a to-be-migrated task based on cache awareness according to an embodiment of the present invention.

With reference to FIG. 1, the following describes a method for determining a to-be-migrated task based on cache awareness according to an embodiment of the present invention.

As shown in FIG. 1, the method for determining a to-be-migrated task based on cache awareness according to this embodiment of the present invention includes the following steps.

S11. Obtain information about each processor core of at least two processor cores, where the information about each processor core includes load information of each processor core.

S12. Determine a source processor core and a destination processor core according to the load information of each processor core.

S13. Monitor the number of cache misses of each task and the number of executed instructions of each task in the source processor core, obtain an MPKI of each task in the source processor core by calculation according to the number of cache misses of each task and the number of executed instructions of each task in the source processor core, and calculate an average MPKI of the source processor core according to the MPKI of each task in the source processor core.

S14. Monitor the number of cache misses of each task and the number of executed instructions of each task in the destination processor core, obtain an MPKI of each task in the destination processor core according to the number of cache misses of each task and the number of executed instructions of each task in the destination processor core, and calculate an average MPKI of the destination processor core according to the MPKI of each task in the destination processor core.

S15. Determine, according to the average MPKI of the source processor core and the average MPKI of the destination processor core, a task to be migrated from the source processor core to the destination processor core.

It is understandable that no sequence limitation is included in the foregoing calculations of the average MPKI of the source processor core and the average MPKI of the destination processor core. The average MPKI of the source processor core may be calculated first, or the average MPKI of the destination processor core may be calculated first, or both of the two may be calculated concurrently.

With reference to FIG. 1, the following describes a method for determining a to-be-migrated task based on cache awareness according to an embodiment of the present invention.

The method for determining a to-be-migrated task based on cache awareness according to this embodiment of the present invention includes the following.

1. Determine a Source Processor Core and a Destination Processor Core.

S11. Obtain information about each processor core of at least two processor cores, where the information about each processor core includes load information of each processor core.

In an embodiment of the present invention, an operating system periodically monitors a status of each of the processor cores to obtain information about the processor cores, where the information about the processor cores includes loads, speeds, and topology locations of the processor cores.

S12. Determine a source processor core and a destination processor core according to the load information of each processor core.

In this step, the operating system obtains the information about each processor core of the at least two processor cores, and information about each processor core includes a load of each processor core. The source processor core and the destination processor core are determined according to the load of each processor core.

If the loads of the processor cores are imbalanced, it is determined that a processor core with a highest load is the source processor core and a processor core with a lowest load is the destination processor core.

In an embodiment of the present invention, in a Linux operating system, a rule defined in a Linux 2.6 kernel is as follows. When a load of a processor core in the system exceeds 25% of a load of another processor core, task migration starts; in this case, the processor core with a lower load is considered as a destination processor core, and the processor core with a higher load is considered as a source processor core.

In an embodiment of the present invention, each processor core is self-centered and performs a search to determine whether there is another processor core whose load exceeds more than 25% of a load of the processor core itself (that is, the self-centered processor core). If there is another processor core, it is considered that there is a load imbalance between the processor cores, and task migration is required. The processor core with a higher load is selected as a source processor core, the self-centered processor core itself is a destination processor core, and a task in the source processor core is migrated from the source processor core to the destination processor core. This process traverses all the processor cores periodically.

In an embodiment of the present invention, all the processor cores are grouped into at least two scheduling groups according to a preset rule.

The operating system periodically monitors statuses of the scheduling groups, where the statuses of the scheduling groups include a load of each processor core in the scheduling groups.

A scheduling group with a highest load is obtained according to the statuses of the scheduling groups, and a processor core with a highest load is obtained according to the load of each processor core in the scheduling groups.

If there is a load imbalance among the scheduling groups, it is determined that a processor core with a highest load in the scheduling group with the highest load is the source processor core, and it is determined that a processor core being monitored is the destination processor core.

In the embodiment of the present invention, by means of iterative traversal, the system searches for a source processor core and a destination processor core. When a load imbalance is found among different scheduling groups, a processor core is considered as a center processor core, and processor cores in scheduling groups different from that of this processor core are traversed first, so as to find a processor core that is with a highest load and is in a scheduling group with a highest load, where the processor core with the highest load is considered as the source processor core. If a processor core that is with a highest load is not found, a search for a processor core that is with a highest load and is in a same scheduling group as the center processor core continues to be performed, the processor core with the highest load is considered as the source processor core, and the processor core in the center is considered as the destination processor core. If an eligible processor core that is with a highest load and is in the same scheduling group is not found either for the processor core in the center, a next processor core continues to be considered as a center processor core, and then traversal continues to be performed.

Figure 3:
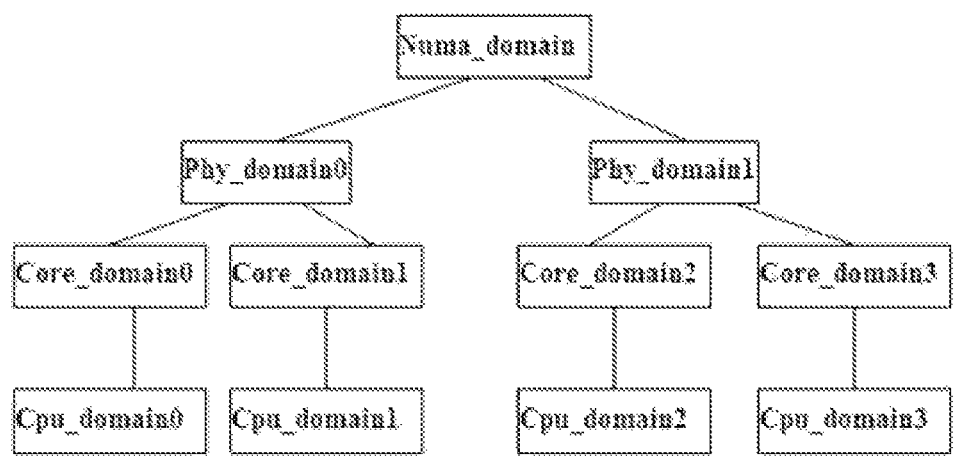
FIG. 3 is a schematic diagram of scheduling domain division and scheduling group division according to an embodiment of the present invention.

As shown in FIG. 3, a scheduling domain refers to a set of a group of processor cores with same properties, and a scheduling domain is divided into different levels according to such system structures as hyper-threading, multi-core, symmetric multi-processor (SMP), or non-uniform memory access (NUMA) architecture. The different levels are connected by using pointers to form a tree-like relationship.

Linux groups all processor cores at a same level into one "scheduling group", and then combines all scheduling groups at a same level to form one "scheduling domain". Load balancing is performed among various scheduling groups in a scheduling domain. A bottom-up traversal manner is adopted when Linux performs load balancing based on scheduling domain; in this way, load balancing is preferentially performed on processor cores that have the slightest effect on a cache, which effectively prevents load balancing from being performed on processor cores that greatly affect the cache. A scheduling domain is established from the lowest layer that has the slightest effect on a cache to higher layers. A scheduling domain is divided into four levels that are Numa_domain, Phy_domain, Core_domain, and SMT_domain (Cpu_domain). It is understandable that the scheduling group division in this figure is merely an example for facilitating understanding of the present invention, and sets no limitation on division of the scheduling groups of the processor cores.

2. Monitor the Numbers of Cache Misses of Tasks and Calculate MPKIs.

S13. Monitor the number of cache misses of each task and the number of executed instructions of each task in the source processor core, obtain an MPKI of each task in the source processor core by calculation according to the number of cache misses of each task and the number of executed instructions of each task in the source processor core, and calculate an average MPKI of the source processor core according to the MPKI of each task in the source processor core.

S14. Monitor the number of cache misses of each task and the number of executed instructions of each task in the destination processor core, obtain an MPKI of each task in the destination processor core according to the number of cache misses of each task and the number of executed instructions of each task in the destination processor core, and calculate an average MPKI of the destination processor core according to the MPKI of each task in the destination processor core.

In an embodiment of the present invention, when a task is created in the source processor core or the destination processor core, an initial value of a cache miss counter and an initial value of an instruction counter are set. When the task runs in the source processor core or the destination processor core, the cache miss counter and the instruction counter start counting; and when the task is suspended from running, counting of the cache miss counter and counting of the instruction counter are suspended. The number of cache misses of the task is obtained according to a count value of the cache miss counter; the number of executed instructions of the task is obtained according to a count value of the instruction counter; and an MPKI of the task is obtained according to the number of cache misses of the task and the number of executed instructions of the task. The foregoing steps are repeated until all tasks in the source processor core or the destination processor core are completely processed.

In an embodiment of the present invention, the cache miss counter or the instruction counter may be implemented by hardware, or may be implemented by software. A counter may be created as a task is created, or may be invoked as a task is created. It is understandable that examples of the counters related to this embodiment set no limitation on technical solutions of the present invention. Usage manners of the counters also include other manners implementable by a person of ordinary skill in the art without creative efforts.

In an embodiment of the present invention, that the task is suspended from running may refer to a suspended state of the task. The suspended state may be generated due to exhaustion of time slices, or may be generated due to a lack of resources required for running the task. It is understandable that manners of suspending running of a task also include other manners implementable by a person of ordinary skill in the art without creative efforts.

In an embodiment of the present invention, the MPKI of each task in the source processor core or the MPKI of each task in the destination processor core is obtained according to a predicted value of MPKI. The predicted MPKI is obtained by calculation by using an exponential smoothing formula and according to a current value of MPKI and a temporarily stored historical value of MPKI, where the two values are obtained by monitoring the number of cache misses of the task and the number of executed instructions of the task.

In general, for instruction code that has not been executed, if an off-line analysis is not performed in advance, it is extremely difficult to correctly know specific actions of the instruction code. Generally, monitoring data is collected on line in a process of code execution, and an action of a program in a next time slice or period of time is predicted by using the monitoring data. With constant running of the code, predicted data is constantly updated. It is based on the predicted data that an operating system makes a scheduling decision. In an embodiment of the present invention, a single exponential smoothing formula is used to predict the latest MPKI of each task. $MPKT_{n+1}(i,k)=(1-\alpha)*MPKI_n(i,k)+\alpha*T_n(i,k)$, where $MPKT_n(i,k)$ is an MPKI of task $T_i^k$ in the $n^{th}$ time slice; and $T_n(i,k)$ is an average MPKI in the $n^{th}$ time slice. $\alpha$ is a constant weighting factor ($0 \leq \alpha \leq 1$) and is used to adjust weight coefficients between $MPKI_n(i,k)$ and $T_n(i,k)$. In an embodiment of the present invention, it is defined that $\alpha=0.8$. In this case, four latest observed values dominate a predicted value, which coincides with a principle of temporal locality and a principle of spatial locality of the program. It is understandable that the definition of $\alpha$ is not limited to the value given in this embodiment of the present invention, but includes another manner implementable by a person of ordinary skill in the art without creative efforts.

In an embodiment of the present invention, in monitoring the number of cache misses of each task in the source processor core or the destination processor core and calculating the MPKI, for convenience of MPKI calculation, a variable needs to be added to a process descriptor to record the number of cache misses of each task as well as the number of executed instructions. Monitoring of the number of cache misses may be completed by using a hardware performance counter. In an embodiment provided by the present invention, online monitoring of the number of cache misses of each task in a Linux kernel may be implemented by rewriting a Perfctr driver. During task creation, a counting event is set first, and counting starts. During task switching, a counting event of a previous task is suspended, a result is recorded to a newly-added variable in the process descriptor, and in this case, a counting event of a next task starts. Two parameters are required to calculate an MPKI of a task. In addition to the number of cache misses of the task, the number of executed instructions of the task needs to be monitored. Therefore, two counting events, data_cache_miss and retired_instructions, may be set, where data_cache_miss is used to monitor the number of cache misses of the task, and retired_instructions is used to monitor the number of executed instructions of the task.

In an embodiment of the present invention, no task is in a processor core in a process in which a system newly starts, and an average number of cache misses of a running queue in this case is 0. When a task is created, an operating system copies corresponding content from a parent process to a child process; however, in this case, it cannot be determined whether the number of cache misses of the parent process is related to the number of cache misses of the child process. Therefore, the number of cache misses is set to 0 during task initialization.

For each processor core, correctly calculating an average MPKI of all tasks in each running queue is the key to scheduling decision-making. When task switching occurs, the average MPKI of the running queue is changed. However, if the average MPKI of the running queue is updated each time task switching occurs, an overhead is extremely high; and if the average MPKI of the running queue is periodically updated, it cannot be ensured that the MPKI is the latest during task migration. Therefore, in the method provided by this embodiment of the present invention, an average MPKI of a running queue of the source processor core and an average MPKI of a running queue of the destination processor core are re-calculated only when there is a task that needs to be migrated.

3. Migrate a Task.

S15. Determine, according to the average MPKI of the source processor core and the average MPKI of the destination processor core, a task to be migrated from the source processor core to the destination processor core.

In an embodiment of the present invention, when the average MPKI of the source processor core are less than the average MPKI of the destination processor core, a task that is with a largest MPKI and is in the source processor core is obtained according to the MPKI of each task in the source processor core, and it is determined that the task that is with the largest MPKI and is in the source processor core is the task to be migrated to the destination processor core.

In an embodiment of the present invention, when the average MPKI of the source processor core are not less than the average MPKI of the destination processor core, a task that is with a smallest MPKI and is in the source processor core is obtained according to the MPKI of each task in the source processor core, and it is determined that the task that is with the smallest MPKI and is in the source processor core is the task to be migrated to the destination processor core.

In an embodiment of the present invention, task migration is divided into two types: task pushing and task pulling. Task pushing occurs during forced migration or when task pulling fails, and task pulling is a main manner of task migration. From the perspective of a current processor core, if a task in the current processor core is migrated to another processor core, it is task pushing; and if a task in another processor is migrated to the current processor core, it is task pulling.

When the current processor core is completely idle, that is, a running queue is empty, no task is executed in the processor core. A reason for this may be that a system is newly initialized or all tasks in the current processor core complete running. In this case, an average number of cache misses of the current processor core is 0, and a task with a relatively large MPKI can be migrated. A reason for selecting to migrate a program with a relatively large number of cache misses to an empty core is that the number of tasks that are with a relatively large number of cache misses and are in the source processor core is reduced, and fair use of a cache is enhanced.

When there is still a task running in the current processor core, a kernel of the operating system periodically determines whether the loads of the processor cores are balanced. If the loads of the processor cores are not balanced, according to the scheduling method based on cache awareness provided by this embodiment of the present invention, in this case, running queues of the current processor core and the source processor core are traversed, an average MPKI value is updated, and then task migration is performed, so as to ensure as far as possible that a difference of an MPKI of a task to be migrated from an average MPKI of the current processor core is the smallest and its difference from an average MPKI of the source processor core is the largest.

In an embodiment of the present invention, a specific task migration rule is as follows. When an average MPKI $\overline{MPKI}$ of the source processor core is greater than or equal to an average MPKI $\overline{MPKI}$ of the destination processor core, a task that is with a smaller MPKI and is in the source processor core is migrated preferentially; and when the average MPKI $\overline{MPKI}$ of the source processor core is less than the average MPKI $\overline{MPKI}$ of the destination processor core, a task that is with a larger MPKI and is in the source processor core is migrated preferentially. A derivation process is as follows.

If a load imbalance occurs in the system, a load of a processor core with a number src is relatively low, and a task needs to be migrated from another core. After operations of find_busiest_group and find_busiest_cpu are performed, a core dst with a highest load is found, and in this case, a part of tasks need to be migrated to the dst (the destination processor core) from the src (the source processor core).

In an embodiment of the present invention, according to an existing scheduling algorithm of Linux, all processor cores are grouped into multiple groups. A search for a group with a highest load is performed first, and then a search for a processor core with a highest load is performed in the group with a highest load. The search for a group with a highest load is completed by using the function find_busiest_group in the Linux kernel; and a search for a processor core with a highest load in a group is completed by using the function find_busiest_cpu.

It is understandable that the functions find_busiest_group and find_busiest_cpu are set in the Linux system for searching for a processor core with a highest load. In another operating system, such as the IOS, Windows, or Unix operating system, another function may be adopted to search for a processor core with a highest load. The functions adopted in this embodiment of the present invention are merely examples for illustrating the present invention, and set no limitation on the present invention.

A process of searching for the task to be migrated is as follows.

a. Use formula (1) to calculate a distance between each task $T_{src}^{k}$ in the source processor core src and the destination processor core dst; and use formula (2) to calculate a distance between each task $T_{src}^{k}$ in the source processor core src and the source processor core src.

$$D_{dst}^{k}=|MPKI(src,k)-\overline{MPKI}(dst)|, k \in [1, N_{src}] \quad (1)$$

$$D_{src}^{k}=|MPKI(src,k)-\overline{MPKI}(src)|, k \in [1, N_{src}] \quad (2)$$

b. In addition to meeting a constraint condition regulated by a default scheduling policy, the task to be migrated needs to meet formula (3), that is, a distance between a task $T_{src}^{m}$ and the destination processor core is required to be as short as possible, and a distance between the task $T_{src}^{m}$ and the source processor core is required to be as long as possible, that is, the maximum value of an objective function of formula (3) is solved for.

$$m = \underset{k \in [1, N_{task}(src)]}{\operatorname{argmax}} \left( [MPKI(src, k) - \overline{MPKI}(src)]^2 - [MPKI(src, k) - \overline{MPKI}(dst)]^2 \right) \quad (3)$$

During solving for a derivative of formula (3) for the variable MPKI(src, k), it may be learned that formula (3) is a monotonically increasing function or a monotonically decreasing function, which depends on which of $\overline{MPKI}$ of the destination processor core and $\overline{MPKI}$ of the source processor core is greater. The maximum value occurs when a value of MPKI(src,k) is maximum or minimum. When $\overline{MPKI}(src) \geq \overline{MPKI}(dst)$, that is, $\overline{MPKI}$ of the source processor core is greater than or equal to $\overline{MPKI}$ of the destination processor core, a value of an objective function in formula (3) is maximum when the value of MPKI(src, k) is minimum. When $\overline{MPKI}(src) < \overline{MPKI}(dst)$ that is, $\overline{MPKI}$ of the source processor core is less than $\overline{MPKI}$ of the destination processor core, the value of the objective function in formula (3) is maximum when the value of MPKI(src, k) is maximum. When it is allowed to migrate multiple tasks, a secondarily closest task is searched for according to the foregoing rules.

In an embodiment of the present invention, the default scheduling policy means that some types of task are not allowed to be selected during to-be-migrated task selection: processes being executed currently; processes, indicated clearly by cpus_allowed, that cannot be migrated to a CPU; and tasks that are switched from a previous CPU and with a time interval less than cache_decay_ticks, which indicates that the cache is still active.

It is the function can_migrate_task that completes evaluating whether a task belongs to the foregoing types.

It is understandable that the foregoing formulas are merely examples given in order to more clearly illustrate this embodiment of the present invention, and set no limitation on this embodiment of the present invention.

In an embodiment of the present invention, before step S15, the method further includes topology awareness.

Topology awareness means that relative locations of a source processor core and a destination processor core need to be considered when an operating system performs scheduling decision-making for task migration, for example, whether the two processor cores share a level 2 cache, whether the two are in a same chip, or whether the two processor cores are located in different processors.

In an embodiment of the present invention, in a Linux system environment, a Linux kernel can automatically identify physical location relationships of processor cores in a start process, that is, identify processor cores that are in one physical CPU and processor cores that are in another physical CPU.

It is first determined whether the source processor core and the destination processor core are in a same physical CPU. If the source processor core and the destination processor core are in different physical CPUs, in this case, a comparison between an MPKI of the source processor core and an MPKI of the destination processor core is not performed; instead, a task that is with a smallest MPKI and is in the source processor core is directly migrated to the destination processor core.

In an embodiment of the present invention, if the source processor core and the destination processor core are in a same physical CPU, the source processor core is a slow core, and the destination processor core is a fast core, in this case, a comparison between the MPKI of the source processor core and the MPKI of the destination processor core is not performed; instead, the task that is with the smallest MPKI and is in the source processor core is migrated to the destination processor core.

In an embodiment of the present invention, a slow core and a fast core may be distinguished according to a clock frequency of a processor core, in-order or out-of-order execution, a cache size, or the like. For example, a processor core whose clock frequency is greater than a value is determined to be a fast core, and a processor core whose clock frequency is less than a value is determined to be a slow core. It is understandable that, a method for distinguishing a fast core and a slow core is not limited to the example in this embodiment of the present invention, but also includes any method for distinguishing a fast core and a slow core and implementable by a person of ordinary skill in the art without creative efforts.

In an embodiment of the present invention, if the source processor core and the destination processor core are in a same physical CPU, the source processor core is a fast core, and the destination processor core is a slow core, in this case, a comparison between the MPKI of the source processor core and the MPKI of the destination processor core is not performed; instead, a task that is with a largest MPKI and is in the source processor core is migrated to the destination processor core.

Figure 2A:
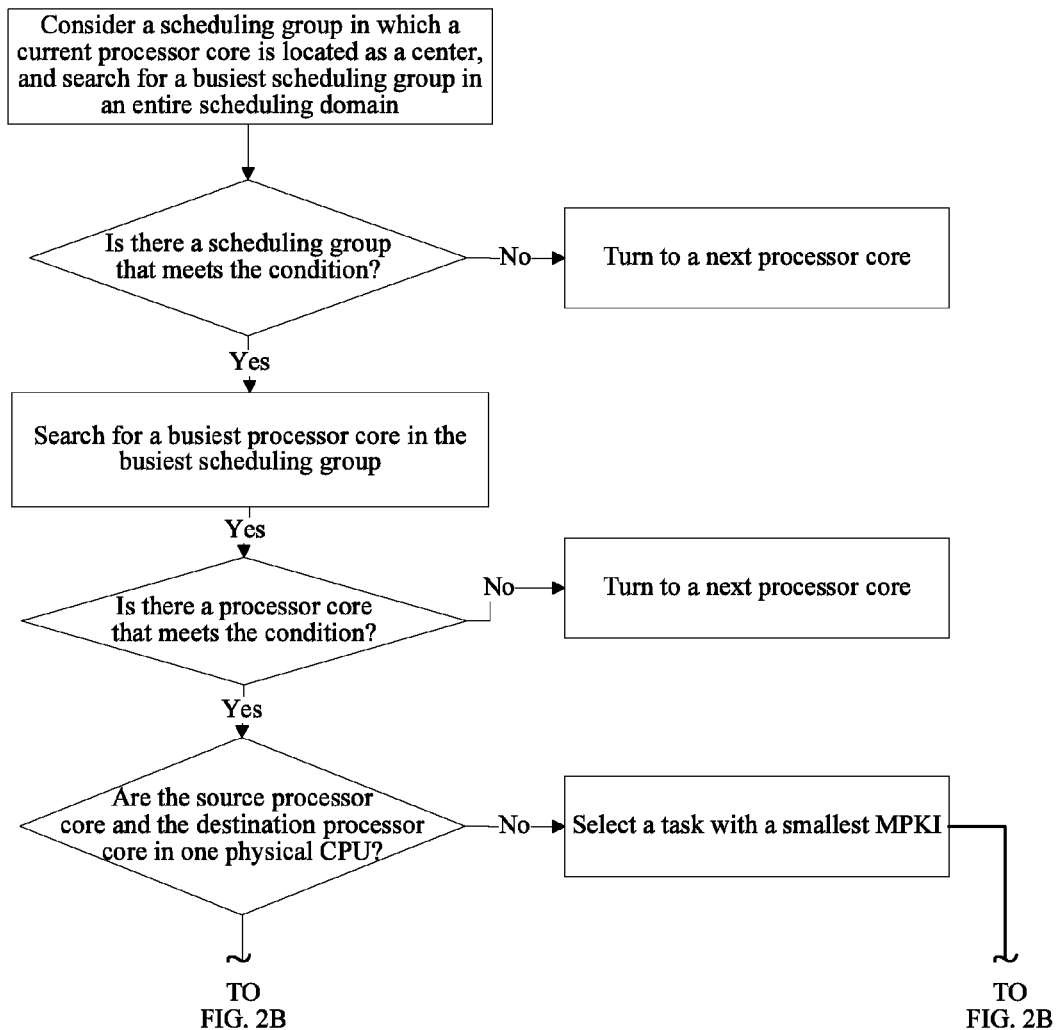
FIG. 2A and FIG. 2B are a flowchart of specific implementation of a method for determining a to-be-migrated task based on cache awareness according to an embodiment of the present invention.
Figure 2B:
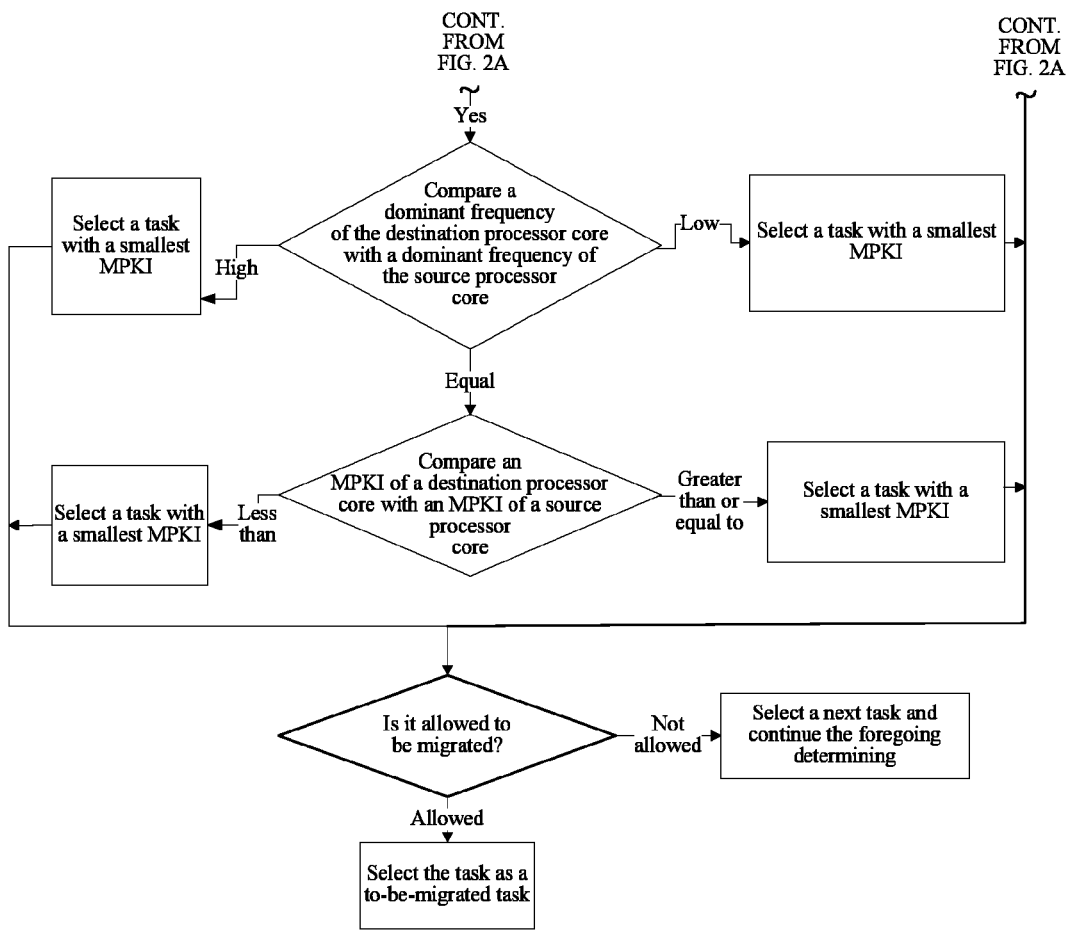

FIGS. 2A and 2B describe implementation of a method for determining a to-be-migrated task based on cache awareness according to an embodiment of the present invention. As shown in FIGS. 2A and 2B, firstly a scheduling group in which a current processor core is located is considered as a center, and a search for a busiest scheduling group is performed in an entire scheduling domain. Then, it is determined whether there is a scheduling group that meets the condition. If there is no such scheduling group, the process turns to a next processor core. The next processor core is considered as a current processor core, and the search for a busiest scheduling group starts again.

If there is a scheduling group that meets the condition, a search for a busiest processor core (may be with a highest load) continues to be performed in the busiest scheduling group. If loads of all processor cores in the scheduling group do not exceed a preset range, it is considered that the group does not meet a preset condition. Then, the process turns to a next processor core, and a traversal search starts again. Otherwise, it is determined that a processor core that meets the condition is a source processor core and the current processor is a destination processor core. The method shown in FIG. 4 may be adopted as a manner of searching for a scheduling domain and a scheduling group.

Then, it is determined whether the source processor core and the destination processor core are in a same physical CPU, and if the two processor cores are not in a same physical CPU, a task that is with a smallest MPKI and is in the source processor core is selected for migration. Before formal migration, it is required to determine whether a system allows the task to be migrated, and a determining principle may be based on the foregoing default scheduling policy. If a determining result is that the task is not allowed to be migrated, a next task continues to be selected, and the foregoing determining is repeated. If the determining result is that the task is allowed to be migrated, the task is selected as a to-be-migrated task.

If the source processor core and the destination processor core are in a same physical CPU, dominant frequencies of the source processor core and the destination processor core continue to be compared. It may be considered that a processor core with a higher dominant frequency is a fast core and a processor core with a lower dominant frequency is a slow core.

When the destination processor core is a fast core and the source processor core is a slow core, a task that is with a smallest MPKI value and is in the source processor core is selected for migration in this case. Before formal migration, it is required to determine whether a system allows the task to be migrated, and a determining principle may be based on the foregoing default scheduling policy. If a determining result is that the task is not allowed to be migrated, a next task continues to be selected, and the foregoing determining is repeated. If the determining result is that the task is allowed to be migrated, the task is selected as a to-be-migrated task.

When the destination processor core is a slow core and the source processor core is a fast core, a task that is with a largest MPKI value and is in the source processor core is selected for migration in this case. Before formal migration, it is required to determine whether a system allows the task to be migrated, and a determining principle may be based on the foregoing default scheduling policy. If a determining result is that the task is not allowed to be migrated, a next task continues to be selected, and the foregoing determining is repeated. If the determining result is that the task is allowed to be migrated, the task is selected as a to-be-migrated task.

When the dominant frequencies of the source processor core and the destination processor core are equal, it is required to determine which of an average MPKI of the source processor core and an average MPKI of the destination processor core in this case is greater.

When the average MPKI of the destination processor core is less than the average MPKI of the source processor core, a task that is with a smallest MPKI and is in the source processor core is obtained according to an MPKI of each task in the source processor core, and the task with the smallest MPKI is migrated to the destination processor core. Before formal migration, it is required to determine whether the system allows the task to be migrated, and the determining principle may be based on the foregoing default scheduling policy. If the determining result is that the task is not allowed to be migrated, a next task continues to be selected, and the foregoing determining is repeated. If the determining result is that the task is allowed to be migrated, the task is selected as a to-be-migrated task.

When the average MPKI of the destination processor core is greater than or equal to the average MPKI of the source processor core, a task that is with a largest MPKI and is in the source processor core is obtained according to the MPKI of each task in the source processor core, and the task with the largest MPKI is migrated to the destination processor core. Before formal migration, it is required to determine whether the system allows the task to be migrated, and the determining principle may be based on the foregoing default scheduling policy. If the determining result is that the task is not allowed to be migrated, a next task continues to be selected, and the foregoing determining is repeated. If the determining result is that the task is allowed to be migrated, the task is selected as a to-be-migrated task.

Figure 4:
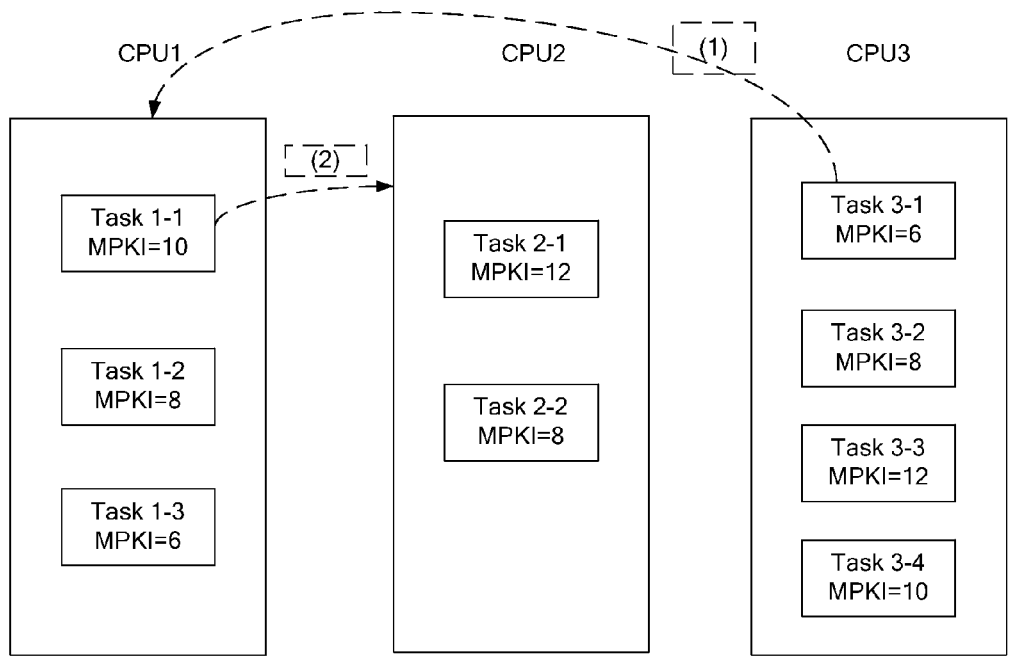
FIG. 4 is a specific example of a method for determining a to-be-migrated task based on cache awareness according to an embodiment of the present invention.
Figure 5:
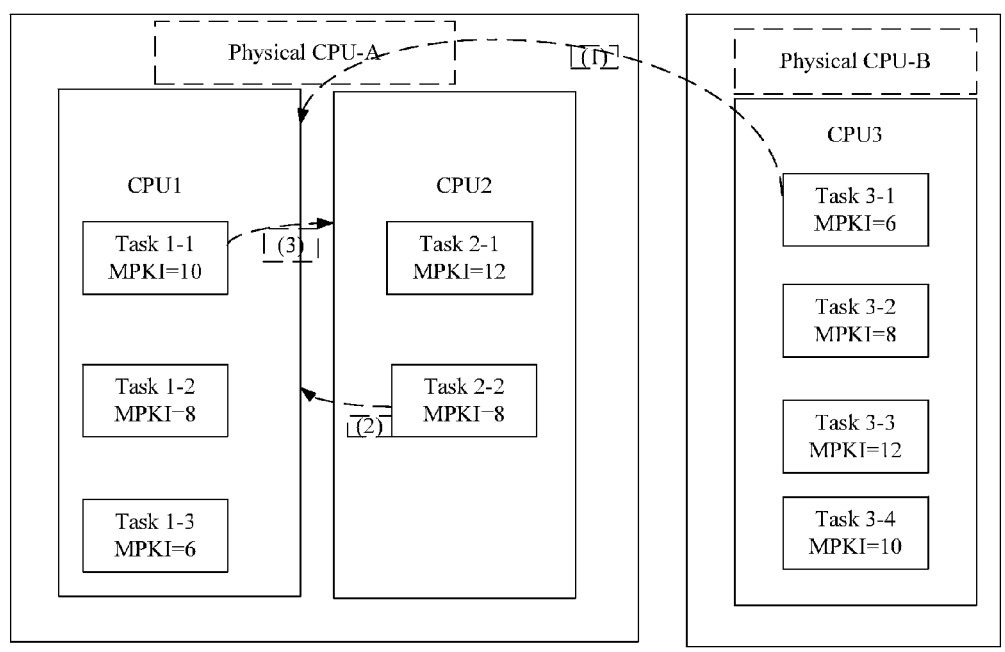
FIG. 5 is another specific example of a method for determining a to-be-migrated task based on cache awareness according to an embodiment of the present invention.

FIG. 4 and FIG. 5 show specific examples of a method for determining a to-be-migrated task based on cache awareness according to an embodiment of the present invention.

As shown in FIG. 4, three tasks run in CPU1, two tasks run in CPU2, and four tasks run in CPU3. In CPU1, an MPKI value of task 1-1 is 10, an MPKI value of task 1-2 is 8, and an MPKI value of task 1-3 is 6; therefore, an average MPKI value of CPU1 is (10+8+6)/3=8. Similarly, it is obtained that an average MPKI value of CPU2 is 10, and an average MPKI value of CPU3 is 9.

If a load of CPU1 is 250, a load of CPU2 is 300, and a load of CPU3 is 500, CPU1 is considered as a destination processor core, CPU3 is considered as a source processor core, and start of task migration is prepared. Because the average MPKI of CPU3 is greater than the average MPKI of CPU1, a task that is with a smallest MPKI and is in CPU3 is selected and then migrated to CPU1, that is, task 3-1 is migrated to CPU1.

If the load of CPU1 is 500, the load of CPU2 is 300, and the load of CPU3 is 350, CPU2 is considered as a destination processor core, CPU1 is considered as a source processor core, and start of task migration is prepared. Because the average MPKI of CPU1 is less than the average MPKI of CPU2, a task that is with a largest MPKI and is in CPU1 is selected and then migrated to CPU2, that is, task 1-1 is migrated to CPU2.

As shown in FIG. 5, CPU1 and CPU2 are in a same physical CPU-A, CPU3 is in another physical CPU-B. A dominant frequency of CPU1 is greater than a dominant frequency of CPU2, so that it may be considered that CPU1 is a fast core, and CPU2 is a slow core. Three tasks run in CPU1, two tasks run in CPU2, and four tasks run in CPU3. In CPU1, an MPKI value of task 1-1 is 10, an MPKI value of task 1-2 is 8, and an MPKI value of task 1-3 is 6; therefore, an average MPKI value of CPU1 is (10+8+6)/3=8. Similarly, it is obtained that an average MPKI value of CPU2 is 10, and an average MPKI value of CPU3 is 9.

(1) When CPU1 is considered as a destination processor core, and CPU3 is considered as a source processor core, because CPU1 and CPU3 are in different physical CPUs, a task that is with a smallest MPKI value and is in CPU3 is migrated to CPU1 in this case, that is, task 3-1 that is with the smallest MPKI value and is in CPU3 is selected as a to-be-migrated task.

(2) When CPU1 is considered as the destination processor core, and CPU2 is considered as the source processor core, because CPU1 and CPU2 are in a same physical CPU-A, CPU2 is a slow core, and CPU1 is a fast core, task 2-2 that is with a smallest MPKI value and is in CPU2 is considered as a to-be-migrated task in this case.

(3) When CPU2 is considered as the destination processor core, and CPU1 is considered as the source processor core, because CPU1 and CPU2 are in a same physical CPU-A, CPU2 is a slow core, and CPU1 is a fast core, task 1-1 that is with a largest MPKI value and is in CPU1 is considered as a to-be-migrated task in this case.

In the method for determining a to-be-migrated task based on cache awareness according to this embodiment of the present invention, an MPKI of each task is monitored first, and then an aggregation algorithm is used, so that finally tasks with similar numbers of cache misses are basically aggregated to one processor core. In this way, it is ensured that the tasks with similar numbers of cache misses do not run at the same time to contend for bandwidth resources of a shared cache and access memory; in addition, negative effects, caused by a task with a relatively large number of cache misses, on a task with a relatively small number of cache misses are avoided, so that fair use of a private cache in a processor core is ensured.

Figure 6:
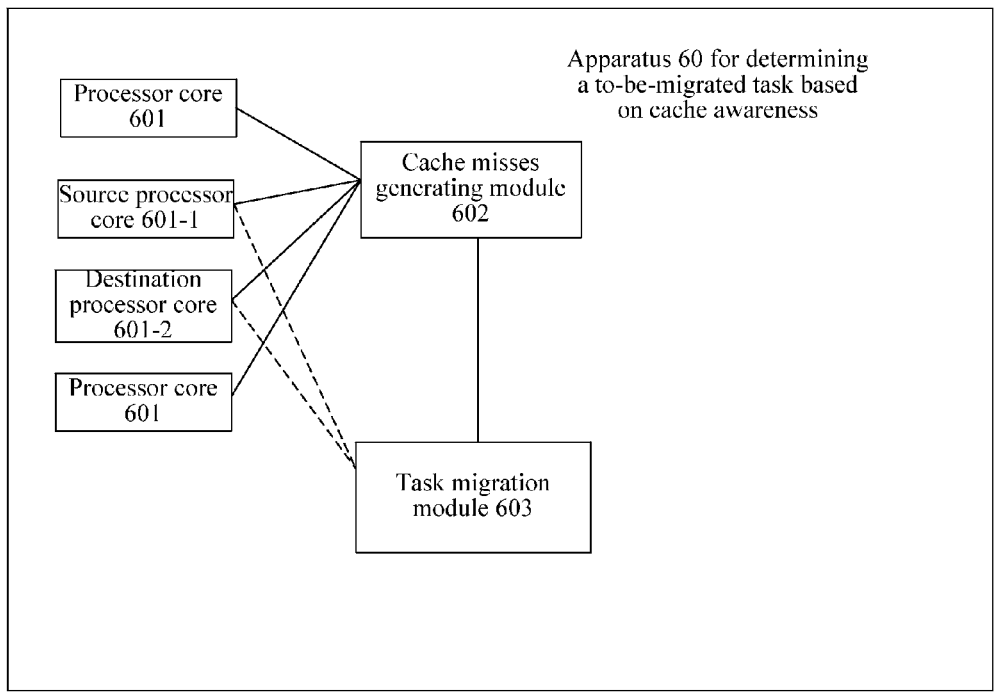
FIG. 6 is a structural diagram of an apparatus for determining a to-be-migrated task based on cache awareness according to an embodiment of the present invention.

According to FIG. 6, the following describes an apparatus 60 for determining a to-be-migrated task based on cache awareness according to an embodiment of the present invention.

As shown in FIG. 6, the apparatus 60 for determining a to-be-migrated task based on cache awareness according to this embodiment of the present invention includes at least two processor cores 601, where a source processor core 601-1 and a destination processor core 602-2 are determined according to loads of the processor cores 601; a cache misses generating module 602, where the cache misses generating module 602 is configured to monitor the number of cache misses of each task and the number of executed instructions of each task separately in the source processor core 601-1 and the destination processor core 601-2, obtain an MPKI of each task in the source processor core 601-1 and the destination processor core 601-2, and separately obtain an average MPKI of the source processor core 601-1 and an average MPKI of the destination processor core 601-2 according to the MPKI of each task in the source processor core 601-1 and the destination processor core 601-2; and a task migration module 603 configured to determine, according to the average MPKI of the source processor core 601-1 and the average MPKI of the destination processor core 601-2, a task to be migrated from the source processor core 601-1 to the destination processor core 601-2.

The processor cores 601 are connected to the cache misses generating module 602, and the task migration module 603 is separately connected to the processor cores 601 and the cache misses generating module 602.

In the apparatus 60 for determining a to-be-migrated task based on cache awareness according to this embodiment of the present invention, an MPKI of each task is monitored first, and then an aggregation algorithm is used, so that finally tasks with similar numbers of cache misses are basically aggregated to one processor core. In this way, it is ensured that the tasks with the similar number of cache misses do not run at the same time to contend for bandwidth resources of a shared cache and access memory; in addition, negative effects, caused by a task with a relatively large number of cache misses, on a task with a relatively small number of cache misses are avoided, so that fair use of a private cache in a processor core is ensured.

In an embodiment of the present invention, all the processor cores 601 are grouped into at least two scheduling groups according to a preset rule; statuses of the scheduling groups are periodically monitored, where the statuses of the scheduling groups include a load of each processor core 601 in the scheduling groups; a scheduling group with a highest load is obtained according to the statuses of the scheduling groups, and a processor core with a highest load is obtained according to the load of each processor core 601 in the scheduling groups; and if there is a load imbalance among the scheduling groups, it is determined that the processor core with the highest load in the scheduling group with the highest load is the source processor core 601-1, and it is determined that a processor core being monitored is the destination processor core 601-2.

In an embodiment of the present invention, when a task is created in the source processor core 601-1, an initial value of a cache miss counter of a task and an initial value of an instruction counter of the task are set, and when the task runs in the source processor core 601-1, the cache miss counter and the instruction counter start counting; when the task is suspended from running, counting of the cache miss counter of the task and counting of the instruction counter of the task are suspended, the number of cache misses of the task is obtained according to a count value of the cache miss counter of the task, the number of executed instructions of the task is obtained according to a count value of the instruction counter of the task; and an MPKI of the task is obtained according to the number of cache misses of the task and the number of executed instructions of the task; and the foregoing steps are repeated until all tasks in the source processor core 601-1 are completely processed.

In an embodiment of the present invention, when the average MPKI of the source processor core 601-1 are not less than the average MPKI of the destination processor core 601-2, a task that is with a smallest MPKI and is in the source processor core 601-1 is obtained according to the MPKI of each task in the source processor core 601-1, and the task with the smallest MPKI is migrated to the destination processor core 601-2.

In an embodiment of the present invention, when the average MPKI of the source processor core 601-1 are less than the average MPKI of the destination processor core 601-2, a task that is with a largest MPKI and is in the source processor core 601-1 is obtained according to the MPKI of each task in the source processor core 601-1, and the task with the largest MPKI is migrated to the destination processor core 601-2.

In an embodiment of the present invention, information that is about the processor cores 601 and is obtained by an operating system includes physical CPU statuses of the processor cores 601. If the source processor core 601-1 and the destination processor core 601-2 are in different physical CPUs, the task that is with the smallest MPKI and is in the source processor core 601-1 is migrated to the destination processor core 601-2.

In an embodiment of the present invention, the information that is about the processor cores 601 and is obtained by the operating system includes performance of the processor cores 601, and whether a processor core 601 is a fast core or a slow core is determined according to the performance of the processor cores 601; and if the source processor core 601-1 and the destination processor core 601-2 are in a same physical CPU, the source processor core 601-1 is a slow core, and the destination processor core 601-2 is a fast core, the task that is with the smallest MPKI and is in the source processor core 601-1 is migrated to the destination processor core 601-2.

In an embodiment of the present invention, if the source processor core 601-1 and the destination processor core 601-2 are in a same physical CPU, the source processor core 601-1 is a fast core, and the destination processor core 601-2 is a slow core, the task that is with the largest MPKI and is in the source processor core 601-1 is migrated to the destination processor core 601-2.

In the apparatus 60 for determining a to-be-migrated task based on cache awareness according to this embodiment of the present invention, an MPKI of each task is monitored first, and then an aggregation algorithm is used, so that finally tasks with similar numbers of cache misses are basically aggregated to one processor core. In this way, it is ensured that the tasks with the similar number of cache misses do not run at the same time to contend for bandwidth resources of a shared cache and access memory; in addition, negative effects, caused by a task with a relatively large number of cache misses, on a task with a relatively small number of cache misses are avoided, so that fair use of a private cache in a processor core is ensured.

In an embodiment of the present invention, the foregoing operations may be completed by using multiple processor cores, and may also be completed in one or more processor cores by using a software program. For example, an executable program may be used in one processor core to control task migration among all processor cores.

It may be clearly understood by a person skilled in the art that, for the purpose of convenient and brief description, for a detailed working process of the foregoing apparatus, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementation manners of the present invention, and are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a to-be-migrated task based on cache awareness in a computing system having multiple processor cores, comprising;
   obtaining information about each of the multiple processor cores, wherein the information comprises load information of each processor core;
   determining a source processor core and a destination processor core according to the load information of each processor core;
   monitoring the number of cache misses of each task and the number of executed instructions of each task in the source processor core;
   obtaining a cache miss ratio of each task in the source processor core by dividing the number of cache misses of the each task by the number of executed instructions of the each task;
   calculating an average cache miss ratio of the source processor core according to cache miss ratios of all tasks in the source processor core;
   monitoring the number of cache misses of each task and the number of executed instructions of each task in the destination processor core;
   obtaining a cache miss ratio of each task in the destination processor core by dividing the number of cache misses of the each task by the number of executed instructions of the each task;
   calculating an average cache miss ratio of the destination processor core according to cache miss ratios of all tasks in the destination processor core; and
   migrating a task that is with a smallest cache miss ratio and is in the source processor core to the destination processor core when the average cache miss ratio of the source processor core is not less than the average cache miss ratio of the destination processor core; or
   migrating a task that is with a largest cache miss ratio and is in the source processor core to the destination processor core when the average cache miss ratio of the source processor core is less than the average cache miss ratio of the destination processor core.

2. The method according to claim 1, wherein determining the source processor core and the destination processor core according to the load information of each processor core comprises:
   grouping the multiple processor cores into at least two scheduling groups according to a preset rule;
   periodically monitoring statuses of the scheduling groups, wherein the statuses of the scheduling groups comprise a load of each processor core in the scheduling groups;
   obtaining a scheduling group with a highest load according to the statuses of the scheduling groups;
   obtaining a processor core with a highest load according to a load of each processor core in the scheduling group with the highest load; and
   when there is a load imbalance among the scheduling groups, determining that the processor core with the highest load in the scheduling group with the highest load is the source processor core, and determining that a processor core being monitored is the destination processor core.

3. The method according to claim 1, wherein the information about the processor cores further comprise physical central processing unit (CPU) statuses of the processor cores, and wherein the method further comprises migrating a task that is with the smallest cache miss ratio and is in the source processor core to the destination processor core when the source processor core and the destination processor core are in different physical CPUs.

4. The method according to claim 1, wherein the information about the processor cores further comprises performance of the processor cores, and wherein the method further comprises:
   determining, according to the performance of the processor cores, whether a processor core is a slow core or a fast core; and
   migrating a task that is with the smallest cache miss ratio and is in the source processor core to the destination processor core when the source processor core and the destination processor core are in a same physical central processing unit (CPU), the source processor core is the slow core, and the destination processor core is the fast core.

5. The method according to claim 4, wherein the method further comprises migrating a task that is with the largest cache miss ratio and is in the source processor core to the destination processor core when the source processor core and the destination processor core are in a same physical CPU, the source processor core is the fast core, and the destination processor core is the slow core.

6. An apparatus for determining a to-be-migrated task based on cache awareness in a computing system having multiple processor cores, comprising a processor configured to:
   obtain information about each of the multiple processor cores, wherein the information comprises load information of each processor core;
   determine a source processor core and a destination processor core according to the load information of each processor core;
   monitor the number of cache misses of each task and the number of executed instructions of each task in the source processor core;

obtain a cache miss ratio of each task in the source processor core by dividing the number of cache misses of the each task by the number of executed instructions of the each task;

calculate an average cache miss ratio of the source processor core according to cache miss ratios of all tasks in the source processor core;

monitor the number of cache misses of each task and the number of executed instructions of each task in the destination processor core;

obtain a cache miss ratio of each task in the destination processor core by dividing the number of cache misses of the each task by the number of executed instructions of the each task;

calculate an average cache miss ratio of the destination processor core according to cache miss ratios of all tasks in the destination processor core; and migrate a task that is with a smallest cache miss ratio and is in the source processor core to the destination processor core when the average cache miss ratio of the source processor core is not less than the average cache miss ratio of the destination processor core; or migrate a task that is with a largest cache miss ratio and is in the source processor core to the destination processor core when the average cache miss ratio of the source processor core is less than the average cache miss ratio of the destination processor core.

7. The apparatus according to claim 6, wherein the processor is configured to:

group the multiple processor cores into at least two scheduling groups according to a preset rule;

periodically monitor statuses of the scheduling groups, wherein the statuses of the scheduling groups comprise load information of each processor core in the scheduling groups;

obtain a scheduling group with a highest load according to the statuses of the scheduling groups;

obtain a processor core with a highest load according to load information of each processor core in the scheduling group with the highest load; and when there is a load imbalance among the scheduling groups, determine that the processor core with the highest load in the scheduling group with the highest load is the source processor core, and determine that a processor core being monitored is the destination processor core.

8. The apparatus according to claim 6, wherein the information about each processor core further comprises a physical central processing unit (CPU) status of each processor core, and wherein the processor is further configured to migrate a task that is with the smallest cache miss ratio and is in the source processor core to the destination processor core when the source processor core and the destination processor core are in different physical CPUs.

9. The apparatus according to claim 6, wherein the information about each processor core further comprises performance of each processor core, and wherein the processor is further configured to:

determine, according to the performance of the processor cores, whether a processor core is a slow core or a fast core; and migrate a task that is with the smallest cache miss ratio and is in the source processor core to the destination processor core when the source processor core and the destination processor core are in the same physical CPU, the source processor core is the slow core, and the destination processor core is the fast core.

10. The apparatus according to claim 9, wherein the processor is further configured to migrate a task that is with the largest cache miss ratio and is in the source processor core to the destination processor core when the source processor core and the destination processor core are in a same physical CPU, the source processor core is the fast core, and the destination processor core is the slow core.

11. A computing system comprising:

multiple processor cores configured to execute tasks, wherein at least one processor core in the multiple processor cores is further configured to:

obtain information about each of the multiple processor cores, wherein the information comprises load information of each processor core;

determine a source processor core and a destination processor core according to the load information of each processor core;

monitor the number of cache misses of each task and the number of executed instructions of each task in the source processor core;

obtain a cache miss ratio of each task in the source processor core by dividing the number of cache misses of the each task by the number of executed instructions of the each task;

calculate an average cache miss ratio of the source processor core according to cache miss ratios of all tasks in the source processor core;

monitor the number of cache misses of each task and the number of executed instructions of each task in the destination processor core;

obtain a cache miss ratio of each task in the destination processor core by dividing the number of cache misses of the each task by the number of executed instructions of the each task;

calculate an average cache miss ratio of the destination processor core according to cache miss ratios of all tasks in the destination processor core; and migrate a task that is with a smallest cache miss ratio and is in the source processor core to the destination processor core when the average cache miss ratio of the source processor core is not less than the average cache miss ratio of the destination processor core; or migrate a task that is with a largest cache miss ratio and is in the source processor core to the destination processor core when the average cache miss ratio of the source processor core is less than the average cache miss ratio of the destination processor core.

12. The computing system according to claim 11, wherein the information about each processor core further comprises physical central processing unit (CPU) status of each processor core, wherein the at least one processor core in the multiple processor cores is further configured to migrate a task that is with the smallest cache miss ratio and is in the source processor core to the destination processor core when the source processor core and the destination processor core are in different physical CPUs.

13. The computing system according to claim 12, wherein the information about each processor core further comprises performance of each processor core, and wherein the at least one processor core in the multiple processor cores is further configured to:

determine, according to the performance of the processor cores, whether a processor core is a slow core or a fast core; and migrate a task that is with the smallest cache miss ratio and is in the source processor core to the destination processor core when the source processor core and the destination processor core are in the same physical CPU, the source processor core is the slow core, and the destination processor core is the fast core.

14. The computing system according to claim 13, wherein the at least one processor core in the multiple processor cores is further configured to migrate a task that is with the largest cache miss ratio and is in the source processor core to the destination processor core when the source processor core and the destination processor core are in the same physical CPU, the source processor core is the fast core, and the destination processor core is the slow core.

* * * * *